United States Patent Office 3,031,469
Patented Apr. 24, 1962

3,031,469
NEW 15,17-DISUBSTITUTED - 1,3,5(10) - ESTRATRI-
ENS AND METHOD OF PREPARING THE SAME
Seymour Bernstein, New City, and Edward W. Cantrall,
Pearl River, N.Y., and Ruddy Littell, River Vale, N.J.,
assignors to American Cyanamid Company, New York,
N.Y., a corporation of Maine
No Drawing. Filed Oct. 24, 1961, Ser. No. 147,149
7 Claims. (Cl. 260—397.4)

This invention relates to new steroids of the C-18 series. More particularly, it relates to C-15 substituted estrones and estradiols and methods of preparing the same.

The novel steroids of the present invention can be illustrated by the following structural formula:

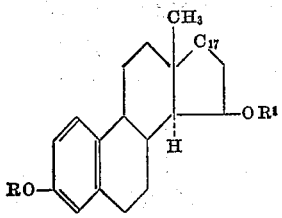

wherein R is a member of the group consisting of hydrogen and lower alkyl radicals, $R^1$ is a member of the group consisting of lower alkenyl and mononuclear aryl lower alkyl radicals and $C_{17}$ is a divalent radical of the group consisting of

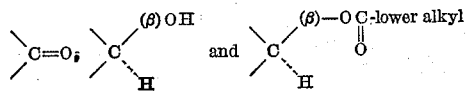

radicals.

The present compounds are, in general, white crystalline solids relatively insoluble in water but soluble in methanol, ethanol, ethyl acetate, acetone and the like.

The compounds of the present invention, having a keto group in the C-17 position, usually described as estrone derivatives can be prepared by reacting the steroid 3-methoxy-1,3,5(10),15-estratetraen-17-one with a lower alkenyl or mononuclear aryl lower alkyl alcohol alkoxide. The lower alkenyl alcohol alkoxide can be, for example, potassium allyl alcoholate, sodium allyl alcoholate, potassium-2-butene alcoholate, sodium-2-butene alcoholate, potassium 2-hexene alcoholate, sodium-2-hexene alcoholate and the like. The mononuclear allyl lower alkyl alcohol alkoxide can be, for example, potassium benzyl alcoholate, sodium benzyl alcoholate, potassium phenethyl alcoholate, sodium phenethyl alcoholate, potassium phenpropyl alcoholate, sodium phenpropyl alcoholate and the like. This reaction is usually carried out at a temperature within the range of from about 15° C. to 60° C. and is usually complete in from 10 minutes to 4 hours. The preparation of the starting material 3-methoxy-1,3,5(10), 15-estratetraen-17-one is described hereinafter and in our copending application Serial No. 147,150, filed October 24, 1961 in which application the corresponding 3-hydroxy steroid is described and claimed as a new compound.

The 17-hydroxy steroids of the present invention usually described as substituted estradiol derivatives can be prepared by reducing the corresponding estrone derivatives described above with, for example, sodium borohydride, potassium borohydride, lithium aluminum anhydride or the like.

The steroids of the present invention are pharmacologically active. They are useful in the treatment of hypercholesterolemia and disorders associated therewith. Their biological activity is selective and they can achieve other responses of the estrogenic hormones without producing a corresponding feminization. The compounds are therefore useful in the treatment of cardiovascular and circulatory disorders often associated with or indicated by higher content of cholesterol in the animal system.

The following examples describe in detail the preparation of representative C-15 substituted estrones and estradiols of the present invention.

EXAMPLE 1

Preparation of 15β-Benzyloxy-3-Methoxy-1,3,5(10)-Estratrien-17-one

A solution of 2.0 g. of 3-methoxy-1,3,5(10),15-estratetraen-17-one in 60 ml. of benzyl alcohol is stirred in an atmosphere of nitrogen with 1.5 g. of powdered potassium hydroxide for 3.5 hours. Addition of ethyl acetate causes the formation of a precipitate which is removed by filtration. The filtrate is steam-distilled and the aqueous residue from the distillation is extracted with ethyl acetate, washed twice with saturated saline, dried and evaporated. The resulting oil is chromatographed on 100 g. of a magnesium silicate adsorbent. The fractions eluted with ether-benzene (1:10) gives 2.19 g. of an oil which yields 490 mg. of crystals, melting point 87–89° C., upon crystallization from ether-petroleum ether. The mother liquor, after evaporation, is subjected to partition chromatography on diatomaceous earth with n-heptane-methyl cellosolve. This gives 1.3 g. of oil, which upon crystallization from methanol gives an additional 660 mg. of 15-benzyloxy compound, melting point 90–92° C. An analytically pure sample obtainable by crystallization from ether-petroleum ether has the melting point 96–98° C.

EXAMPLE 2

Preparation of 17β-Acetoxy-15β-Benzyloxy-3-Methoxy-1,3,5(10)-Estratriene

A solution of 660 mg. of 15β-benzyloxyestrone methyl ether and 600 mg. of sodium borohydride in 60 ml. of methanol containing 5 drops of 10% aqueous sodium hydroxide is stirred at room temperature for 3 hours. Addition of water caused the formation of a gelatinous precipitate which is filtered, dissolved in ethyl acetate, washed with saturated saline, dried and evaporated to an intractable oil whose infrared spectrum showed the absence of a carbonyl function. The oil, 15β-benzyloxy-3-methoxy-1,3,5(10)-estratriene-17β-ol, is heated for one hour at 95° C. with 4 ml. of pyridine and 1 ml. of acetic anhydride. Upon cooling the reaction mixture is diluted with ethyl acetate, washed with saturated saline, dried and evaporated. The resulting crude residue is crystallized from methanol to give 474 mg. of the 15-benzyloxy-17-acetate, melting point 118–120° C. The analytically pure specimen, obtained by further crystallization from methanol, has a melting point of 118–120° C.

EXAMPLE 3

Preparation of 15β-Allyloxy-3-Hydroxy-1,3,5(10)-Estratrien-17-one

A solution of 1.2 g. of 16-bromoestrone acetate and 220 mg. of p-toluenesulfonic acid monohydrate in 60 ml. of toluene and 5 ml. of ethylene-glycol is distilled slowly through a Vigreux column for 44 hours. (Total distillate 45 ml.) The reaction mixture is cooled, neutralized with saturated sodium bicarbonate solution diluted with ethyl acetate, washed with saturated saline, dried and evaporated. Crystallization of the crude residue from methanol gives 825 mg. of white crystals, melting point 234–236° C. Two further crystallizations from the same solvent gives the pure bromoketal, melting point 246–247° C.

A solution of 400 mg. of potassium in 20 ml. of t-butyl alcohol is evaporated when 20 ml. of xylene is added and the evaporation is repeated. A solution of 600 mg. of the bromoketal in 40 ml. of xylene is added to the potassium t-butoxide and the mixture is heated under reflux in an atmosphere of nitrogen for 18 hours. Upon cooling, the mixture is diluted with ether, washed with saturated saline, dried and evaporated to give 275 mg. of a pasty solid which is crystallized from methanol to give 130 mg. of white crystals, melting point 215–219° C. Two additional crystallizations from acetone-petroleum ether gives the pure ketal tetraene, melting point 218–220° C.

A solution of 1.0 g. of 17-ethylenedioxy-1,3,5(10),15-estratetraen-3-ol and 60 mg. of p-toluenesulfonic acid monohydrate in 70 ml. of acetone and 12 ml. of water is stirred at room temperature for 1.5 hours. The solution is then diluted with 350 ml. of ether, washed once with dilute sulfuric acid, once with dilute sodium bicarbonate solution and finally with saturated saline. After evaporation of the solvents, the resulting solid is crystallized from methanol to give 475 mg. of 15-dehydroestrone, melting point 249–251° C. Further crystallization of the product from methanol and from chloroform-methanol gives the pure sample, melting point 250–252° C.

A solution of 1.0 g. of 15-dehydroestrone in 50 ml. of allyl alcohol containing 2.0 ml. of 5% sodium hydroxide is stirred at room temperature for 50 minutes, after which water is added followed by several drops of acetic acid. The mixture is extracted with benzene, the benzene extract washed once with saturated sodium bicarbonate solution and twice with saturated sodium chloride solution. The extract is dried, evaporated and crystallized from methanol-water to give 710 mg. of needles, melting point 165–168° C. Further crystallization does not alter the melting point.

EXAMPLE 4

*Preparation of 15β-Benzyloxy-3-Hydroxy-1,3,5(10)-Estratrien-17-one*

A solution of 1.0 g. of 15-dehydroestrone and 600 mg. of powdered potassium hydroxide in 20 ml. of benzyl alcohol is stirred at room temperature for 4 hours, then it is diluted with ethyl acetate, filtered, washed once with dilute sulfuric acid, saturated sodium bicarbonate solution and saturated saline, evaporated and steam-distilled. The residue from steam distillation is extracted with chloroform, dried and evaporated to give, after crystallization from benzene, 480 mg. of pale yellow crystals, melting point 124–127° C. Two crystallizations of a small portion from acetone-benzene gives pure 15β-benzyloxyestrone, melting point 125–128° C.

We claim:
1. A compound of the formula:

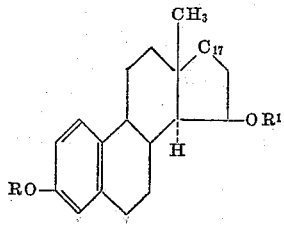

wherein R is a member of the group consisting of hydrogen and lower alkyl radicals, R¹ is a member of the group consisting of lower alkenyl and mononuclear aryl lower alkyl radicals and C₁₇ is a divalent radical of the group consisting of

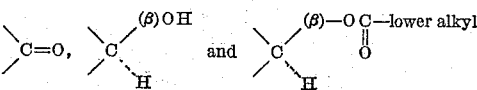

radicals.

2. The compound 15β-allyloxy-3-hydroxy-1,3,5(10)-estratrien-17-one.

3. The compound 15β-benzyloxy-3-hydroxy-1,3,5(10)-estratrien-17-one.

4. The compound 15β-benzyloxy-3-methoxy-1,3,5(10)-estratrien-17-one.

5. The compound 15β-benzyloxy-3-methoxy-1,3,5(10)-estratrien-17β-ol.

6. The compound 17β-acetoxy-15β-benzyloxy-3-methoxy-1,3,5(10)-estratrien.

7. A method of preparing compounds having the formula:

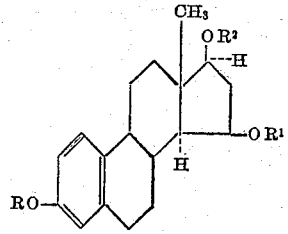

wherein R is selected from the group consisting of hydrogen and lower alkyl radicals, R¹ is selected from the group consisting of lower alkenyl and mononuclear aryl lower alkyl radicals and R² is selected from the group consisting of hydrogen and lower alkanoyl radicals which comprises reacting a compound having the formula:

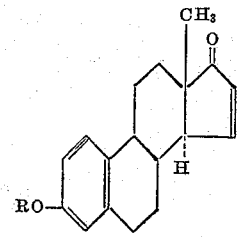

wherein R is as defined above with a member selected from the group consisting of allyl alkoxides and mononuclear aryl lower alkyl alkoxides and subsequently with a reducing agent selected from the group consisting of sodium borohydride, potassium borohydride and lithium aluminum and recovering said compound therefrom.

No references cited.